United States Patent
Podilchuk

(10) Patent No.: US 7,840,060 B2
(45) Date of Patent: Nov. 23, 2010

(54) SYSTEM AND METHOD FOR MACHINE LEARNING USING A SIMILARITY INVERSE MATRIX

(75) Inventor: Christine Podilchuk, Warren, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 996 days.

(21) Appl. No.: 11/619,121

(22) Filed: Jan. 2, 2007

(65) Prior Publication Data

US 2008/0025596 A1    Jan. 31, 2008

Related U.S. Application Data

(60) Provisional application No. 60/812,646, filed on Jun. 12, 2006, provisional application No. 60/861,686, filed on Nov. 29, 2006, provisional application No. 60/861,685, filed on Nov. 29, 2006, provisional application No. 60/861,932, filed on Nov. 30, 2006, provisional application No. 60/873,179, filed on Dec. 6, 2006.

(51) Int. Cl.
*G06K 9/00* (2006.01)

(52) U.S. Cl. .................. 382/155; 382/190; 382/209; 700/30

(58) Field of Classification Search .......... 382/103, 382/118, 155, 156; 700/30
See application file for complete search history.

(56) References Cited

U.S. PATENT DOCUMENTS

| | | | |
|---|---|---|---|
| 4,503,557 A | 3/1985 | Maeda | |
| 5,299,269 A * | 3/1994 | Gaborski et al. | 382/156 |
| 5,940,778 A | 8/1999 | Marfurt et al. | |
| 6,134,344 A | 10/2000 | Burges | |
| 6,161,130 A | 12/2000 | Horvitz | |
| 6,633,857 B1 | 10/2003 | Tipping | |
| 6,671,404 B1 * | 12/2003 | Kawatani et al. | 382/190 |
| 6,694,311 B1 * | 2/2004 | Smith | 1/1 |
| 6,826,300 B2 * | 11/2004 | Liu et al. | 382/159 |
| 6,898,469 B2 | 5/2005 | Bickford | |
| 6,915,009 B2 | 7/2005 | Foote | |
| 6,944,602 B2 | 9/2005 | Cristianin | |
| 6,990,217 B1 | 1/2006 | Moghaddam | |
| 7,054,847 B2 | 5/2006 | Hartman | |
| 7,174,040 B2 * | 2/2007 | Lienhart et al. | 382/155 |
| 7,447,353 B2 * | 11/2008 | Diederichs et al. | 382/165 |
| 7,483,919 B2 * | 1/2009 | Galperin | 1/1 |
| 7,493,340 B2 * | 2/2009 | Rui | 1/1 |
| 7,734,075 B2 * | 6/2010 | Sun et al. | 382/128 |
| 2003/0086593 A1 * | 5/2003 | Liu et al. | 382/118 |

(Continued)

*Primary Examiner*—Gregory M Desire
(74) *Attorney, Agent, or Firm*—Fox Rothschild LLP; Dennis M. Carleton

(57) ABSTRACT

A system and method of machine learning that uses an inverse matrix of a reference similarity matrix as a transformation matrix. The reference similarity matrix relates a reference set of objects to themselves using a distance metric such as an image edit distance. The transformation matrix is used to improve the performance of query vectors in classifying or identifying digital representations of an unknown object. The query vector is a measure of similarity between the unknown object and the members of the reference set. Multiplying the query vector by the transformation matrix produces an improved query vector having improved similarity scores. The highest improved similarity score indicates the best match member of the reference set If the similarity score is high enough, the unknown object may either be classified as belonging to the same class, or recognized as being the same object, as the best match object.

12 Claims, 5 Drawing Sheets

U.S. PATENT DOCUMENTS

| | | |
|---|---|---|
| 2004/0002776 A1* | 1/2004 | Bickford .................. 700/30 |
| 2004/0006398 A1* | 1/2004 | Bickford .................. 700/30 |
| 2004/0015462 A1* | 1/2004 | Lienhart et al. ............ 706/45 |
| 2005/0147302 A1 | 7/2005 | Leung |
| 2005/0149360 A1* | 7/2005 | Galperin .................. 705/2 |
| 2006/0245617 A1* | 11/2006 | Shan et al. ............... 382/103 |
| 2006/0251320 A1* | 11/2006 | Diederichs et al. ........ 382/165 |
| 2006/0251339 A1 | 11/2006 | Gokturk |
| 2007/0014457 A1* | 1/2007 | Jolly et al. ................ 382/128 |
| 2007/0122009 A1* | 5/2007 | Jee et al. .................. 382/118 |
| 2007/0184373 A1* | 8/2007 | Mertens .................... 430/65 |
| 2008/0014563 A1* | 1/2008 | Visani et al. .............. 434/155 |
| 2008/0133521 A1* | 6/2008 | Podilchuk .................. 707/6 |
| 2009/0028455 A1* | 1/2009 | Nakamura et al. ........ 382/254 |

* cited by examiner

SYSTEM AND METHOD FOR MACHINE LEARNING USING A SIMILARITY INVERSE MATRIX

CROSS REFERENCE TO RELATED APPLICATIONS

This application is related to, and claims priority from, U.S. Provisional Patent application No. 60/861,932 filed on Nov. 30, 2006, by C. Podilchuk entitled "New learning machine based on the similarity inverse matrix(SIM)", the contents of which are hereby incorporated by reference.

FIELD OF THE INVENTION

The present invention relates to systems and method of machine learning, and more particularly, systems and methods of machine learning using similarity inverse matrices.

BACKGROUND OF THE INVENTION

Numerous machine-learning approaches have been explored for recognizing patterns. Such systems have been used for a variety of applications including target recognition, speech recognition and optical character recognition.

A machine or system is said to learn if, given a few examples of a class of patterns, it learns to generalize how to recognize other members of the class from those few examples. This is similar to how people learn. For instance, a child shown a number examples of a chair can, from those few examples, generalize the concept of a chair and so identify many different types of chair. Machine-learning approaches, which include neural networks, hidden Markov models, belief networks, support vector and other kernel-based machines, are ideally suited for domains characterized by the existence of large amounts of data, noisy patterns and the absence of general theories.

The majority of learning machines that have been applied to data analysis are neural networks trained using back-propagation. This is a gradient-based method in which errors in classification of training data are propagated backwards through the network to adjust the bias weights of the network elements until a mean squared error is minimized. A significant drawback of back-propagation neural networks is that the empirical risk function may have many local minima, i.e., a case that can easily obscure the optimal solution from discovery. Standard optimization procedures employed by back-propagation neural networks may converge to a minimum, but the neural network method cannot guarantee that even a localized minimum is attained, much less the desired global minimum. The quality of the solution obtained from a neural network depends on many factors, and particularly, on the skill of the practitioner implementing the neural network. Even seemingly benign factors, such as the random selection of initial weights, can lead to poor results. Furthermore, the convergence of the gradient-based method used in neural network learning is inherently slow. A further drawback is that the sigmoid function typically used as the transfer function between the inputs and outputs of each neuron in the network has a scaling factor that, unless carefully chosen, may significantly affect the quality of approximation. Possibly the largest limiting factor of neural networks as related to knowledge discovery is the "curse of dimensionality" associated with the disproportionate growth in required computational time and power for each additional feature or dimension in the training data.

Largely because of these shortcomings of neural networks, more recent work on machine learning has tended to focus on kernel methods. Kernel methods, based on statistical learning theory, are used for their conceptual simplicity as well as their remarkable performance. Support vector machines, kernel PCA (principal component analysis), kernel Gram-Schmidt, kernel Fischer discriminate, Bayes point machines, and Gaussian processes are just a few of the algorithms that make use of kernels for problems of classification, regression, density estimation and clustering. Kernel machines can operate in extremely rich feature spaces with low computational cost, in some cases accessing spaces that would be inaccessible to standard systems, e.g., gradient-based neural networks, due to their high dimensionality.

Kernel methods typically operate by mapping data into a high dimensional feature space, and then applying one of many available general-purpose algorithms suitable for work in conjunction with kernels. The kernel virtually maps data into a feature space so that the relative positions of the data in feature space can be used as the means for evaluating, e.g., classifying, the data. The degree of clustering achieved in the feature space, and the relation between the clusters and the labeling to be learned, should be captured by the kernel.

Kernel methods exploit information about pairwise similarity between data points. "Similarity" may be defined as the inner product between two points in a suitable feature space, information that can be obtained with little computational cost. The mapping into feature space may be achieved in an implicit way, i.e., the algorithms are rewritten to need only inner product information between input points. The inner product may then replaced with a generalized inner product, or "kernel function". This function returns the value of an inner product between feature vectors representing images of the inputs in some feature space.

While the kernel machine learning module is general purpose, the kernel itself is problem specific. It is the kernel that makes it possible to effectively work in very rich feature spaces, provided the inner products can be computed. By developing algorithms that use only the inner products, it is possible to avoid the need to compute the feature vector for a given input. Each application of a kernel machine, therefore, typically requires developing specific new algorithms to make the learning module work.

A machine learning method in which the quality of the solution is not dependent on the user's prior experience, that is general purpose and does not need algorithms that are specific to an application would be of great use in a variety of recognition and classifications problems including, but not limited to, automatic pattern and target recognition including biometric face recognition, video tagging and video searching applications.

SUMMARY OF THE INVENTION

Briefly described, the present invention provides a system and method of machine learning that may be applied to recognition and classification of digital representations of objects. The method is general purpose, does not require customization for specific applications and is not dependent on operator experience or skill to produce good, consistent results.

In a preferred embodiment, the method uses a transformation matrix to improve the use of similarity vectors in recognizing and characterizing unknown objects. In a preferred embodiment, the transformation matrix is an inverse matrix of a reference similarity matrix. The reference similarity matrix relates each member of a gallery or reference set of objects to itself and to each other. Each element of the reference matrix is a similarity measure between digital representations of the objects. The similarity measure may be made using some suitable distance metric such as, but not limited to, the P-edit distance (a.k.a. the pictorial or image edit distance) or other technique for measuring similarity between two signals. The transformation matrix is used to improve one or more query vectors in classifying or identifying an unknown object. The query vector is a measure of the similarity between the unknown object and each of the members of the reference. In a preferred embodiment, the utility of the query vector in recognizing or characterizing the unknown object may be significantly improved by multiplying the query vector by the transformation matrix to produce an improved query vector. The improved query vector is comprised of a plurality of improved similarity scores. The improved similarity score that is the highest may then be selected to learn to the best match, i.e., that member of the reference set to which the unknown object is most similar. If the similarity score between the best match and the unknown object is above a predetermined threshold, the unknown object may be either classified as belonging to the same class of objects as the best match object, or the unknown object may be recognized as being the best match object.

In a further preferred embodiment, the transform matrix may be used to generate an improved reference similarity matrix comprised of improved reference vectors. A comparison similarity matrix may then be generated that compares the improved query vectors to the improved reference vectors using, for instance, an L2 norm between the vectors.

In yet a further embodiment of the invention, the reference similarity matrix may be represented as the sum of an identity matrix and an error matrix. A plurality of such reference similarity matrices may be used to produce a plurality of transform matrices. A plurality of improved query vector may be produced and summed into a single improved query vector that may be used to learn the best match to the unknown object.

These and other features of the invention will be more fully understood by references to the following drawings.

DETAILED DESCRIPTION

The present invention applies to systems and methods of machine learning using similarity inverse matrices.

The method of the present invention may, for instance, be used to find any face in a picture, as currently done using kernel machines such as a Support Vector Machine (SVM), but without the drawbacks of kernel machines. Like an SVM, the method of the present invention may, for instance, learn to detect a face under all types of pose, illuminations and backgrounds. Once the face is detected it may then be rescaled and normalized for its illumination differences with the training images. This resulting new image may then used to expand an existing similarity matrix or used to create a new similarity matrix. Although the detailed description below is, for simplicity, described primarily with reference to a face detection system, one of ordinary skill in the art will readily appreciate that the system and method of the present invention may be used to detect and classify a wide variety of objects in images by machine learning including, but not limited to, animals, cars, airplanes, trees, plants, pocketbooks, consumer products and bombs.

The SIM learning machine approach of this invention has the advantages of being computationally inexpensive and only requires that a suitable inverse or pseudo-inverse matrix exists. This type of inverse matrix is generally available. The kernel approach has more restrictive mathematical constraints that need to be satisfied in order to justify its use. Only a few nonlinear transformations such as polynomial powers have been proven to be appropriate for kernel machines. In particular, a kernel selected for a SVM must satisfy the well known Mercer's Theorem, which state that the kernel must be positive definite in order to qualify as an inner-product kernel. This is a more restrictive constraint then the SIM learning machine requirement of the existence of a pseudo-inverse or inverse similarity matrix.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1:
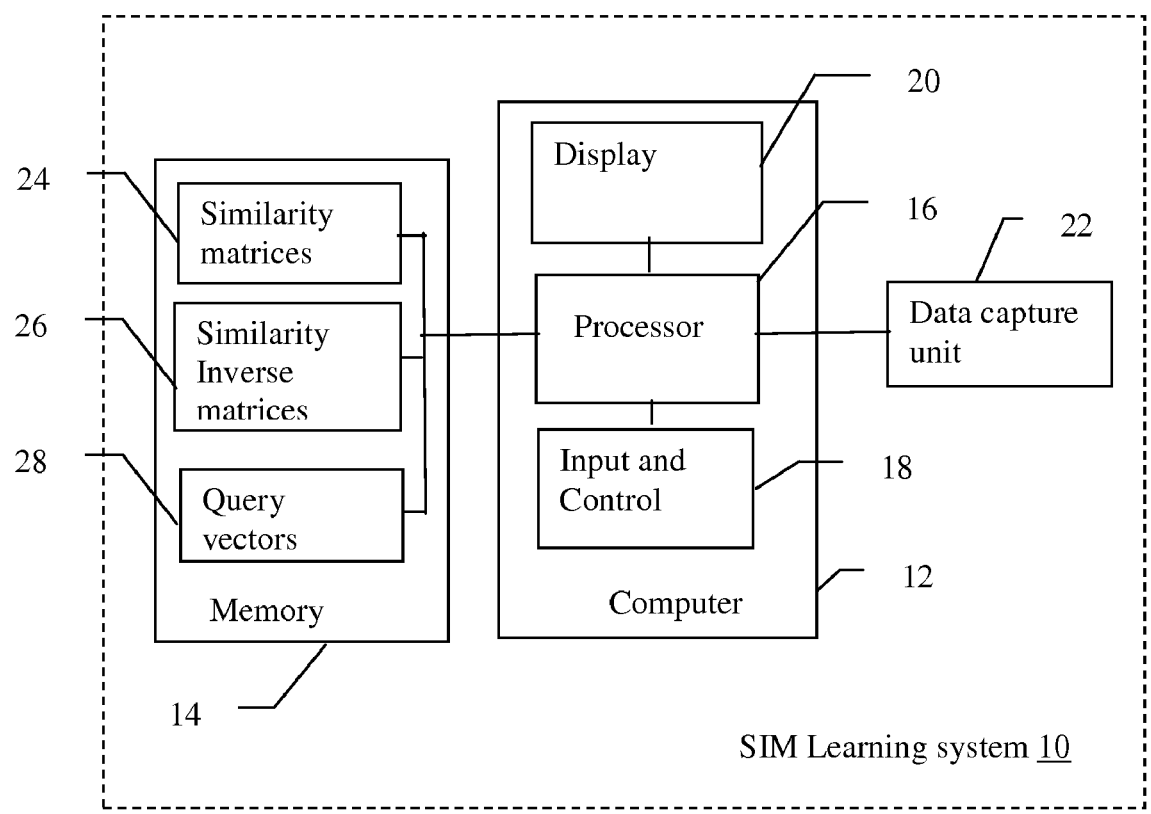
FIG. 1 is schematic representation of an exemplary embodiment of a similarity inverse matrix (SIM) learning system.

FIG. 1 is schematic representation of an exemplary embodiment of a similarity inverse matrix (SIM) learning system 10 of the present invention. The SIM learning system 10 may include a computer 12, a memory unit 14 and a suitable data capture unit 22.

The computer 12 may, for instance, be a typical digital computer that includes a central processor 16, an input and control unit 18 and a display unit 20. The central processor 16 may, for instance, be a well-known microprocessor such as, but not limited to, a Pentium™ microprocessor chip manufactured by Intel Inc. of Santa Clara, Calif. The input and control unit 18 may, for instance, be a keyboard, a mouse, a track-ball or a touch pad or screen, or some other well-known computer peripheral device or some combination thereof. The display unit 20 may, for instance, be a video display monitor, a printer or a projector or some other well-known computer peripheral device or some combination thereof. The central processor 16 may be connected to a suitable data capture unit 22 that for identification purposes may, for instance, be a still or video camera that may be analogue or digital and may, for instance, be a color, infra-red, ultra-violet or black and white camera or some combination thereof. The data capture unit 22 may also, or instead, be a scanner or a fax machine or other suitable computer peripheral capable of capturing appropriate data for the SIM learning system 10. The central processor 16 may have an internal data store and may also be connected to an external memory unit 14 that may, for instance, be a hard drive, a tape drive, a magnetic storage volume or an optical storage volume or some combination thereof. The memory unit 14 may store one or more similarity matrices 24, one or more similarity inverse matrices 26 and one or more query vectors 28, as well as other data and databases.

Figure 2:
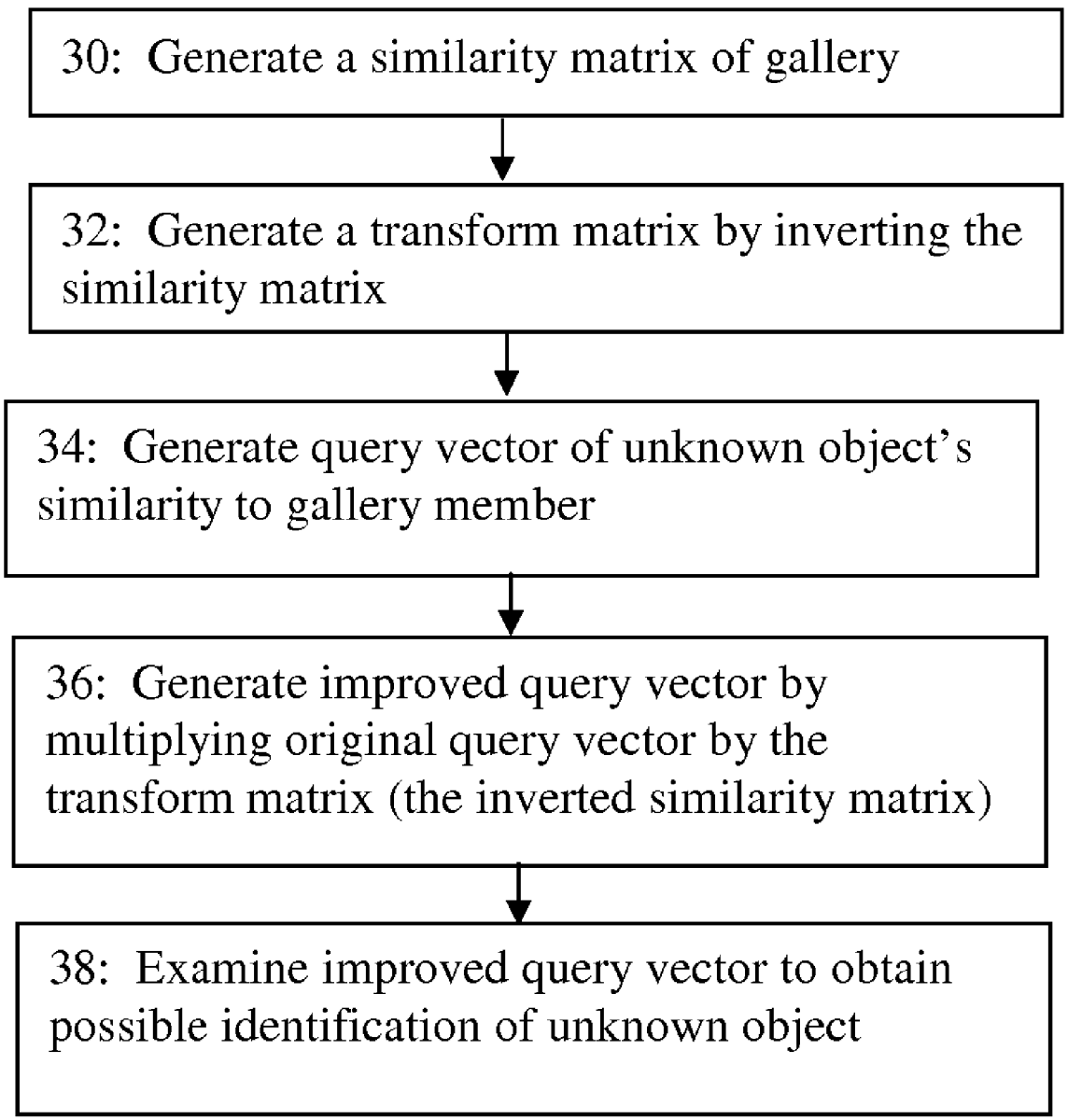
FIG. 2 is a flow diagram showing steps in an exemplary method of using a SIM learning system to identify an unknown object.

FIG. 2 is a flow diagram showing steps in an exemplary method of using an SIM learning system to identify an unknown object.

In step 30, a suitable software package operating on the SIM learning system computer 12 may generate a similarity matrix of a reference gallery. In, for instance a face recognition application, the reference gallery may be, but is not limited to, a labeled gallery of images of subjects that may be stored in a face database on the memory unit 14. The gallery images may, for instance, be good quality passport images.

The gallery image set P may, for instance, consist of n images with one image per subject. $P_i$ may then represent the $i^{th}$ image in the gallery. A similarity matrix $S_{train}$ may then be generated by comparing each of the gallery images with every other image in the gallery set, as illustrated by the following matrix:

$$S_{train} = \begin{bmatrix} B(P_1, P_1) & \cdots & B(P_n, P_1) \\ \vdots & \ddots & \vdots \\ B(P_1, P_n) & \cdots & B(P_n, P_n) \end{bmatrix}$$

The comparison of how similar each image is to each other may be done by a number of methods including, but not limited, to using a similarity metric such as the P-edit distance, also known as the image edit distance and described in detailed in co-pending U.S. patent application Ser. No. 11/619,092 filed by C. Podilchuk on Jan. 2, 2007 entitled "System and Method for Comparing Images using an Edit Distance", the contents of which are hereby incorporated by reference. An image edit distance is sometimes referred to as a Pictorial edit distance or a P-edit distance.

Alternate similarity measures that may be used in creating similarity matrices for images include, but are not limited to, a degree of bijectivity. A degree of bijectivity between images may, for instance, be considered as the percentage of the one image that can have a one-to-one mapping to the other image.

Other methods of generating similarity matrices include, but are not limited to, the well-known Principal Component Analysis (PCA), the well-known dynamic programming for text and speech and the well-known Basic Local Alignment Search Tools (BLAST) used in searching DNA sequences.

Each element of the similarity matrix of the gallery images $S_{train}$ may then be represented by $B(P_i, P_j)$, which may represent the P-edit distance between the images $P_i$ and $P_j$ depending on which similarity metric was used to create the matrix.

The similarity matrix may also be represented by a vector of vectors $V^i_{gallery}$, as shown by the following equation:

$$S_{train} = [V^1_{gallery} \quad \cdots \quad V^n_{gallery}] \text{ where,}$$

$$V^i_{gallery} = \begin{bmatrix} B(P_i, P_1) \\ \vdots \\ B(P_i, P_n) \end{bmatrix}$$

Ideally, the similarity matrix would be an identity matrix having a match indicated by similarity score of 1 for elements that match a gallery image with itself and a similarity score of 0 for non-matches, i.e., the elements of the matrix that represent matching a member of the gallery with another member of the gallery. In practice, the similarity matrix is not an identity matrix due both to errors and noise in matching images of the same object and due to some degree of similarity between images of different objects. A transformation matrix T that transforms the gallery similarity matrix into an identity matrix may, however, be useful in improving identification queries. The inverse of the similarity matrix is a transformation that transforms matrix S to an identity matrix, as seen from the following equations:

$$S'_{train} = TS_{train} = I_{n \times n}$$

$$T = S_{train}^{-1}$$

In step 32 a transform matrix is generated that is the inverse of the gallery similarity matrix.

In step 34 a query vector is generated, the elements of which represent the similarity between an unknown object and each of the members of the gallery. For instance, an n×1 vector V of the P-edit scores, or other technique for measuring similarity between two signals, may be computed using a query image $Q_i$ against all the gallery images, using the same similarity metric used to generate the original similarity matrix. The query vector is illustrated by the following equation:

$$V_{query} = \begin{bmatrix} B(Q_i, P_1) \\ \vdots \\ B(Q_i, P_n) \end{bmatrix}$$

The unknown object may be identified by examining the elements of the query vector $V_{query}$. The element with the largest similarity may be selected, and, if this is above a predetermined value, the unknown object identified as the gallery object referred to by the selected element.

The identification of the unknown may, however, be improved by using the transformation matrix found in step 32.

In step 36, an improved query vector $V^t_{query}$ may be generated using the transform matrix T, as shown in the following equation:

$$V'_{query} = TV_{query}$$

In step 38, the improved query vector $V^t_{query}$ may be examined for a maximum similarity element.

If the similarity measure of the maximum similarity element is above a predetermined threshold, the unknown object may be classified as belonging to a same classification class as the gallery object referred to by the selected element.

If the similarity measure of the maximum similarity element is above some further, usually higher, predetermined threshold, the unknown object may be identified as being the gallery object referred to by the selected element.

Figure 3:
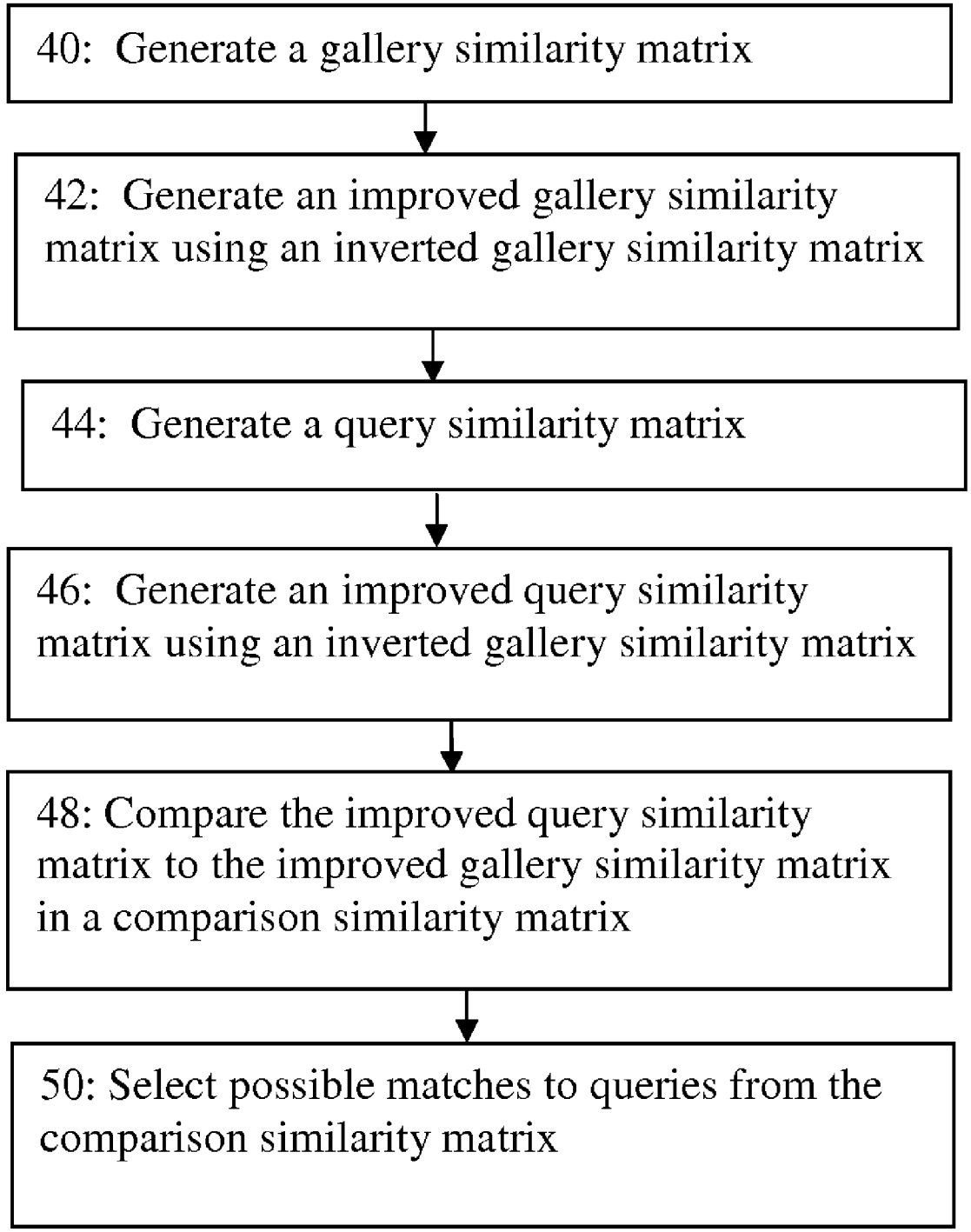
FIG. 3 is a flow diagram showing steps in a further exemplary method of using a SIM learning system to identify an unknown object.

FIG. 3 is a flow diagram showing steps in a further exemplary method of using an SIM learning system to identify an unknown object.

In step 40, a gallery similarity matrix is generated as described above in step 30 of the previous embodiment.

In step 42, an improved gallery similarity matrix is generated using a transformation vector T that is the inverse of the gallery similarity matrix.

In step 44, a query similarity matrix is generated. This may be done using a set of query images. In an embodiment in which there are m images in the query image set Q, each of them can be used to generate a query vector as described in detail in step 36 of the previous embodiment above. All the vectors $V_{query}$ corresponding to each of the m images may then be concatenated to obtains a similarity matrix $S_{quuery}$ for the query set.

In step 46 an improved query similarity matrix may be generated using the transform matrix T that is the inverse of the gallery similarity matrix. The vectors $V'_{query}$ generated by the m images of the query set may be used to obtain the matrix $S'_{query}$. Steps 44 and 46 may be summarized by the following equations:

$$S_{query} = [V_{query}^1 \quad \cdots \quad V_{query}^m]$$

$$S'_{query} = [V'^1_{query} \quad \cdots \quad V'^m_{query}]$$

also, $$S'_{query} = T \square S_{query}$$

In step 48 a comparison similarity matrix may be generated that compares each element of each of the improved vectors contained in the improved query similarity matrix with the vectors contained in the improved gallery matrix. The resultant similarity matrix compares all members of the query set with all members of the gallery set.

In a preferred embodiment, the L2 norm (a.k.a. the Euclidian norm) of the error between $V'_{gallery}$ and $V'_{query}$ may be used as a similarity measure between a gallery and query image. The comparison similarity matrix is generated using this metric, as illustrated by the following equation:

$$S'_{L2} = \begin{bmatrix} \|V'^1_{query} - V'^1_{gallery}\|_2^2 & \cdots & \|V'^m_{query} - V'^1_{gallery}\|_2^2 \\ \vdots & \ddots & \vdots \\ \|V'^1_{query} - V'^n_{gallery}\|_2^2 & \cdots & \|V'^m_{query} - V'^n_{gallery}\|_2^2 \end{bmatrix}$$

In step 50 a possible match to a query may be selected by examining the comparison similarity matrix for a maximum similarity score.

If the maximum similarity score is above a predetermined threshold, the query object may be classified as being as being of the same class as the associated gallery object.

If the maximum similarity score is above a further, predetermined threshold, the query object may be identified as being the associated gallery object.

Figure 4:
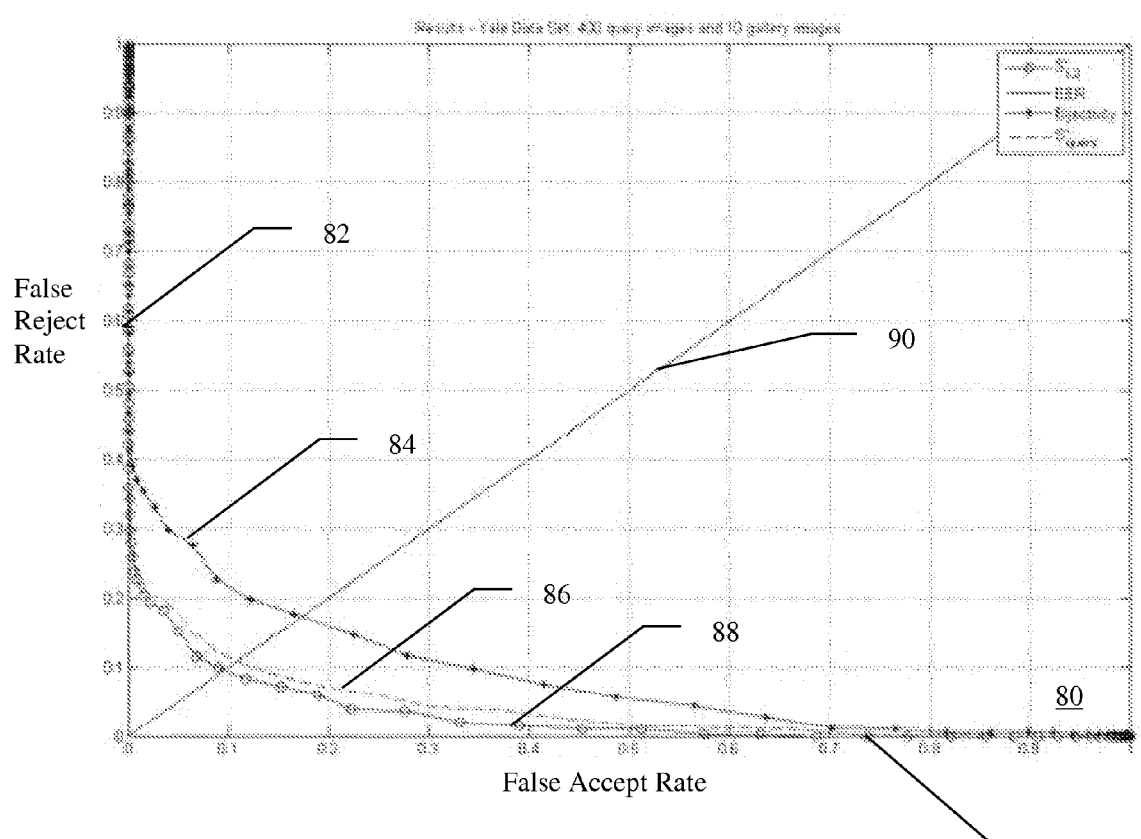
FIG. 4 is a graph showing a comparison of using several methods of recognizing images.

FIG. 4 is a graph showing a comparison of the effectiveness of several different methods of the present invention for recognizing images.

The graph of FIG. 4 is a receiver operation characteristic curve or ROC curve 80. A ROC curve 80 is adapted from radar performance analysis and plots a false acceptance rate 82 on the horizontal axis against a false rejection rate 82 on the vertical axis. FIG. 4 shows the results of recognizing 400 query images using a reference gallery of 10 gallery images.

Curve 84, a simple ROC curve, is a plot of selecting a match based on similarity vectors generated using a P-edit distance, or other technique for measuring similarity between two signals, as described in, for instance, step 34 above. The curve is plotted by varying the threshold that determines recognition of the object. The points of the curve on the extreme right of the graph occur when the threshold is set very low, so that a high number of false acceptances occur. As the threshold that determines recognition of the object is raised, the points further toward the left hand side of the graph occur. Eventually, when the threshold is very close to a similarity of 1, a high degree of false rejections occur, giving the points on the extreme left of the graph. The intersection of the simple ROC curve 84 and the equal error rate line 90 may be taken as a threshold setting that gives the optimum performance of the method used to generate the curve. The closer this intersection is to zero, the better the method being used to generate the curve.

Curve 86, a SIM improved ROC curve, is a plot of the results of selecting a match based on the similarity vectors that have been improved using the transform matrix that is the inverse of the gallery similarity matrix as described in step 36 above. The intersection of the SIM improved ROC curve 86 and the equal error rate line 90 is significantly closer to the origin than the intersection of the simple ROC curve 84 and the equal error rate line 90. This shows that using the SIM method has significantly improved the ability of the learning system 10 to identify the images.

Curve 88, an L2 norm, SIM improved ROC curve, is a plot of the results of selecting a match based on comparison similarity matrix constructed using the L2 norm of the error between $V'_{gallery}$ and $V'_{query}$ as described in detail in step 48 above. The intersection of the L2 norm, SIM improved curve 88 and the equal error rate line 90 is closer to the origin than both the SIM improved ROC curve 86 and the simple ROC curve 84, showing that using the L2 norm, SIM method has further improved the ability of the SIM learning system 10 to identify images.

A transformation T that generalizes well on unseen data may take the form given by the following equations:

$$S'_{query} = TS_{query} \approx I_{n \times m}$$

$$S'_{query} = TS_{query} = I_{n \times m} + E$$

where, E is an error matrix and $I_{n \times m}$ is an identity matrix, i.e., a matrix with ones indicating a match on the leading diagonal, and zeroes indicating a non-match everywhere else. Ideally, E would be a matrix with all elements equal to zero.

Figure 5:
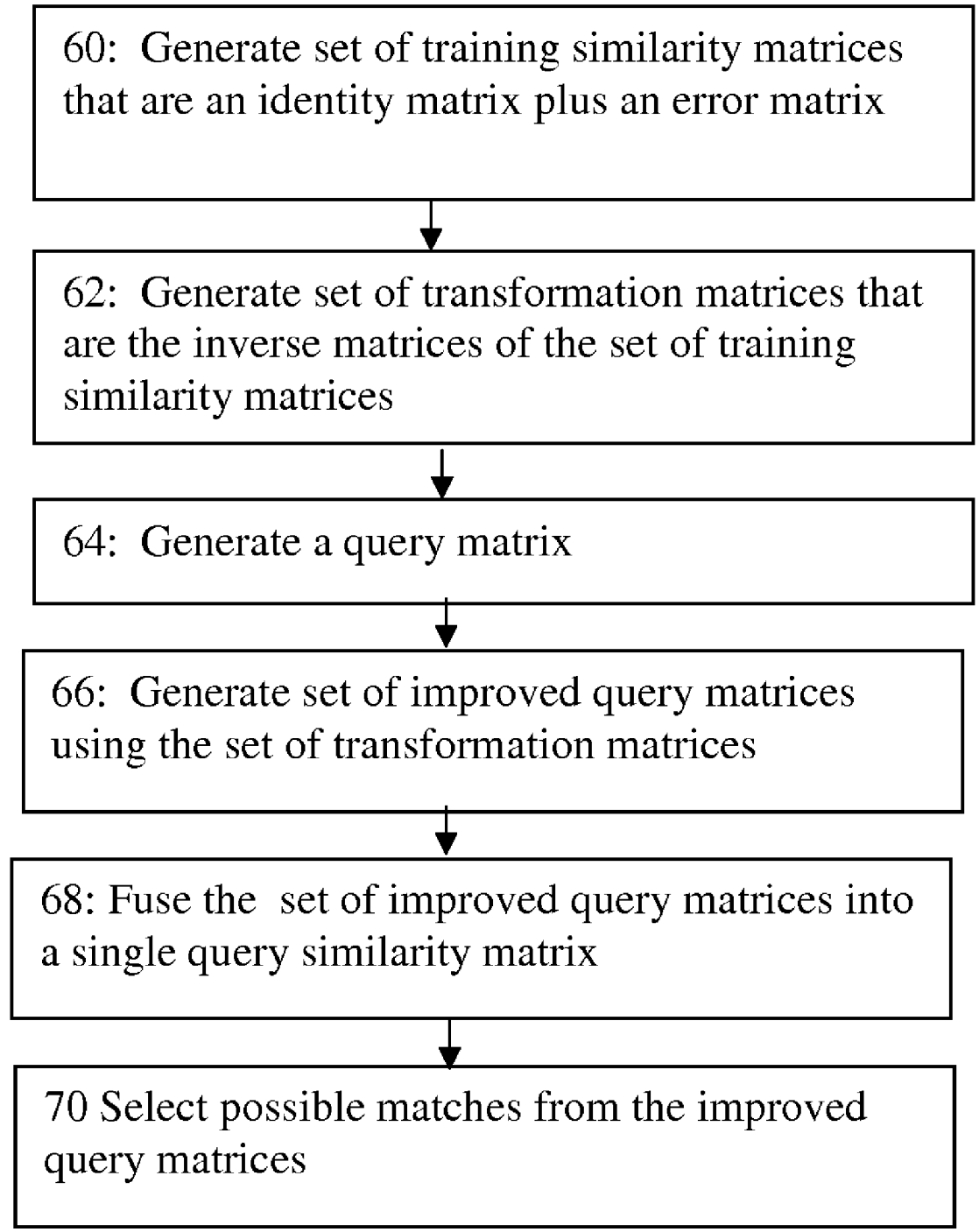
FIG. 5 is a flow diagram showing steps in another exemplary method of using a SIM learning system to identify an unknown object.

This representation of the similarity matrix as the summation of an identity I and an error matrix E leads us to a further method for using the SIM transformation in a learning machine. FIG. 5 is a flow diagram showing steps this further exemplary method of using a SIM learning system to identify an unknown object.

In step 60, a set of training similarity matrices are generated that are an identity matrix plus an error matrix. The error matrix $E^i$ may, for instance, be randomly generated using the distribution of scores in the $S_{train}$ matrix obtained from the gallery set. The error matrix may additionally include randomly, or semi-randomly, generated noise.

In step 62, a set of transformation matrices that are the inverse matrices of the set of training similarity matrices generated in step 60. The actions of steps 60 and 62 may be summarized by the following equations:

$$S_{train}^i = I_{n \times n} + E_{n \times n}^i$$

$$T^i = [S_{train}^i]^{-1} \text{ for } i = 1, 2, \ldots, k$$

In step 64, the query matrix $S_{query}$ may be generated as before.

In step 66, the query matrix is improved by generating a set of improved query matrices, one each for the set of transform matrices generated in step 62. The action of step 66 may be represented by the following equation:

$$S'_{query}{}^i = TS_{query}$$

In step 68 the final similarity matrix may be obtained by fusing two or more of the improved query matrices $S'_{query}{}^i$ generated in step 66. The action of step 68 may be represented by the following equation:

$$S'_{query} = \sum_{i=1}^{k} \lambda_i S'^{i}_{query} \text{ such that,}$$

$$\sum_{i=1}^{k} \lambda_i = 1$$

In step 70 a possible match to a query may be selected by examining the comparison similarity matrix for a maximum similarity score.

If the maximum similarity score is above a predetermined threshold, the query object may be classified as belonging to a same class of objects as the associated gallery object.

If the maximum similarity score is above a further predetermined threshold, the query object may be identified as being the associated gallery object.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

The invention claimed is:

1. A system for machine learning, comprising:
   a computer;
   a computer-readable medium having software stored thereon that, when executed by said computer, performs a method comprising the steps of:
      creating a reference similarity matrix relating a set of reference objects, said similarity matrix containing similarity scores between each reference object and all other reference objects;
      obtaining a transformation matrix that is the inverse of said reference similarity matrix;
      creating a query vector relating an unknown object to said set of reference objects using a similarity measure, said query vector containing similarity scores between said unknown object and each of said reference objects;
      generating an improved query vector using said transformation matrix; and
      learning which of said reference objects is a best match to said unknown object using said improved query vector.

2. The system of claim 1 wherein said reference similarity matrix relates each of said set of reference objects to itself and to each other using said similarity measure.

3. The system of claim 2 wherein said step of generating an improved query vector comprises multiplying said query vector by said transformation matrix to obtain a plurality of improved similarity measures.

4. The system of claim 3 wherein said similarity measure is an image edit distance.

5. The system of claim 4 wherein said method further comprises the step of recognizing said unknown object as said best match if said improved similarity measure relating said best match to said unknown object is greater than a predetermined threshold.

6. The system of claim 4 wherein said method further comprises the step of classifying said unknown object as being in a same class as said best match if said improved similarity measure relating said best match to said unknown object is greater than a predetermined threshold.

7. The system of claim 2 wherein said method further comprises the steps of:
   improving said reference similarity matrix using said transformation matrix, said improved reference similarity matrix comprising one or more improved reference vectors; and
   generating a comparison similarity matrix using said improved query vector and said one of more improved reference vectors;
   wherein said step of learning which of said reference objects is a best match further comprises using said comparison similarity matrix.

8. The system of claim 7 wherein said step of generating a comparison similarity matrix further comprises the steps of:
   obtaining an L2 norm of the error between said improved query vector and said one or more improved reference vectors to obtain a plurality of similarity scores; and
   recognizing said unknown object as said best match if said similarity score relating said best match to said unknown object is greater than a predetermined threshold.

9. The system of claim 8 wherein said similarity measure is an image edit distance.

10. The system of claim 1 wherein said reference similarity matrix comprises an identity matrix and a first error matrix.

11. The system of claim 1 wherein said method further comprises the steps of:
    generating a second similarity matrix comprised of said identity matrix and a second error matrix;
    generating a second transformation matrix that is an inverse of said second similarity matrix;
    generating a second improved query vector using said second transformation matrix; and
    fusing said improved query vector with said second improved query vector to produce a final improved query vector.

12. An apparatus for machine learning, comprising:
    means for creating a reference similarity matrix relating a set of reference objects, said similarity matrix containing similarity scores between each reference object and all other reference objects;
    means for obtaining a transformation matrix that is the inverse of said reference similarity matrix;
    means for creating a query vector relating an unknown object to said set of reference objects using a similarity measure, said query vector containing similarity scores between said unknown object and each of said reference objects;
    means for generating an improved query vector using said transformation matrix; and
    means for learning which of said reference objects is a best match to said unknown object using said improved query vector.

* * * * *